United States Patent
Sajadieh et al.

(10) Patent No.: US 9,473,276 B2
(45) Date of Patent: Oct. 18, 2016

(54) COOPERATIVE MULTIPLE BEAM TRANSMISSION

(71) Applicant: Intel IP Corporation, Santa Clara, CA (US)

(72) Inventors: Masoud Sajadieh, Fremont, CA (US); Hooman Shirani-Mehr, Portland, OR (US); Debdeep Chatterjee, Santa Clara, CA (US); Apostolos Papathanassiou, San Jose, CA (US); Jong-Kae Fwu, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 233 days.

(21) Appl. No.: 14/142,293

(22) Filed: Dec. 27, 2013

(65) Prior Publication Data
US 2015/0043439 A1    Feb. 12, 2015

Related U.S. Application Data

(60) Provisional application No. 61/863,902, filed on Aug. 8, 2013.

(51) Int. Cl.
*H04W 4/00*    (2009.01)
*H04L 5/00*    (2006.01)
(Continued)

(52) U.S. Cl.
CPC ............... *H04L 5/0048* (2013.01); *H04L 5/14* (2013.01); *H04W 4/005* (2013.01); *H04W 24/10* (2013.01); *H04W 36/08* (2013.01); *H04W 36/28* (2013.01); *H04W 52/0206* (2013.01); *H04W 52/0209* (2013.01); *H04W 56/0005* (2013.01); *H04W 72/082* (2013.01); *H04W 76/02* (2013.01); *H04W 76/023* (2013.01); *H04W 76/046* (2013.01); *H04L 5/0053* (2013.01); *H04L 5/1469* (2013.01); *H04L 27/2602* (2013.01);
(Continued)

(58) Field of Classification Search
CPC ..................................................... H04W 72/08
USPC ......................................................... 370/329
See application file for complete search history.

(56) References Cited

U.S. PATENT DOCUMENTS

2010/0007573 A1    1/2010    Kuramoto et al.
2010/0056171 A1*   3/2010    Ramprashad et al. ..... 455/452.1
(Continued)

OTHER PUBLICATIONS

International search Report and Written Opinion received for International Application No. PCT/US2014/049621, mailed on Nov. 27, 2014.
(Continued)

*Primary Examiner* — Wei Zhao
(74) *Attorney, Agent, or Firm* — Alpine Technology Law Group LLC

(57) ABSTRACT

Briefly, in accordance with one or more embodiments, cooperation of multiple beams for transmission is provided by identifying at least two beams among multiple beams that are dominant for a user, determining if there is any beam collision between the at least two beams, and, if there is beam collision between the at least two beams, delaying scheduling on one or more weaker ones of the at least two beams for other users and combining the two or more beams for transmission to the user. Alternatively, cooperation of multiple beams for transmission is provided by, if there is beam collision between the at least two beams, muting one or more weaker ones of the at least two beams and transmitting to the user with a stronger one of the at least two beams.

33 Claims, 10 Drawing Sheets

(51) Int. Cl.

| | | |
|---|---|---|
| H04L 5/14 | (2006.01) | |
| H04W 56/00 | (2009.01) | |
| H04W 52/02 | (2009.01) | |
| H04W 76/04 | (2009.01) | |
| H04W 36/08 | (2009.01) | |
| H04W 72/08 | (2009.01) | |
| H04W 76/02 | (2009.01) | |
| H04W 36/28 | (2009.01) | |
| H04W 24/10 | (2009.01) | |
| H04W 72/04 | (2009.01) | |
| H04W 4/02 | (2009.01) | |
| H04W 36/14 | (2009.01) | |
| H04L 27/26 | (2006.01) | |
| H04W 88/08 | (2009.01) | |

(52) U.S. Cl.
CPC ............. *H04W 4/023* (2013.01); *H04W 36/14* (2013.01); *H04W 72/0406* (2013.01); *H04W 72/0446* (2013.01); *H04W 88/08* (2013.01); *Y02B 60/50* (2013.01)

(56) References Cited

U.S. PATENT DOCUMENTS

| | | |
|---|---|---|
| 2011/0065448 A1 | 3/2011 | Song et al. |
| 2012/0202431 A1 | 8/2012 | Hawryluck et al. |
| 2013/0051321 A1* | 2/2013 | Barbieri et al. ............. 370/328 |
| 2014/0177745 A1* | 6/2014 | Krishnamurthy et al. ... 375/267 |

OTHER PUBLICATIONS

International Preliminary Report on Patentability received for International Patent Application No. PCT/US2014/049621, mailed on Feb. 18, 2016, 6 pages.

\* cited by examiner

COOPERATIVE MULTIPLE BEAM TRANSMISSION

CROSS-REFERENCE TO RELATED APPLICATIONS

The present application claims the benefit of U.S. Provisional Application No. 61/863,902 filed Aug. 8, 2013. Said Application No. 61/863,902 is hereby incorporated herein in its entirety.

BACKGROUND

Demand for cellular data capacity has grown exponentially. In order to meet this growth, interest has turned to cellular systems having large antenna arrays that are referred to as Massive multiple-input and multiple-output (Massive MIMO) or Full Dimension MIMO (FD-MIMO). Such large antenna arrays are capable of achieving higher spectral efficiencies by serving a greater number of users simultaneously. As a result, large antenna arrays are being considered as a promising new technology to deliver capacity enhancement in the future releases of 3GPP Long-Term Evolution (LTE) and LTE-Advanced (LTE-A) cellular systems.

Interference is a major source of performance degradation in cellular systems. Massive MIMO using very large antenna arrays can substantially reduce interference and increase throughput. Higher number of antenna elements in a closely spaced antenna configuration enhances angular and spatial resolution by producing narrow and directive beams, thereby mitigating the interference. Coordinated Multi-Point (CoMP) is another technique to combat interference particularly for cell-edge cellular users wherein interfering transmitting points cooperate to boost average and cell-edge throughputs.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
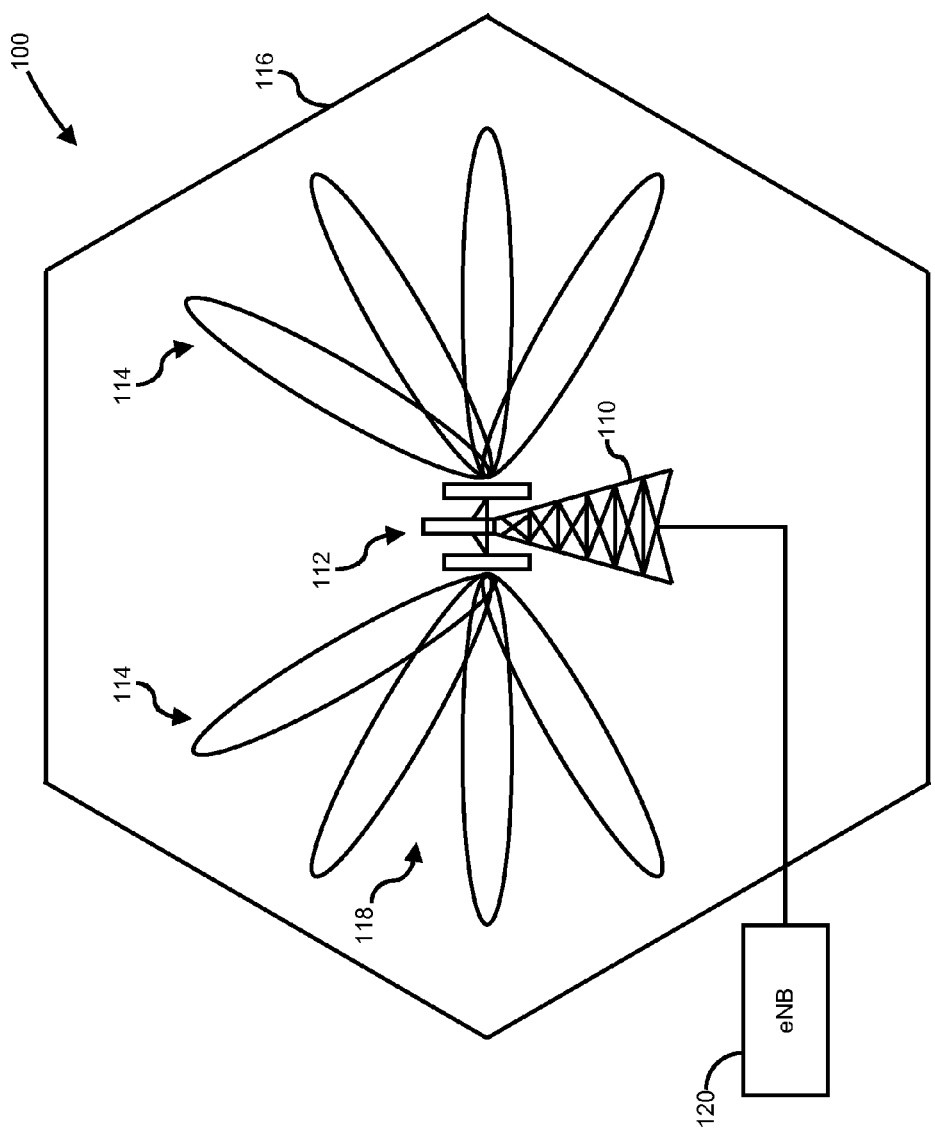
FIG. 1 is a diagram of a large antenna array having multiple directive beams as transmission points suitable for cooperative multiple beam transmission in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of a large antenna array having multiple directive beams as transmission points suitable for cooperative multiple beam transmission in accordance with one or more embodiments will be discussed. As shown in FIG. 1, a massive multiple-input, multiple-output (Massive MIMO) system 100 may comprise a large antenna array 110 having a large number of antenna elements 112 that are driven coherently to create individual directive beams 114. Large antenna array 100 may be coupled to an enhanced Node B (eNB) 120, for example where massive MIMO system 100 is in compliance with a Third Generation Partnership Project (3GPP) standard as one example. In one or more embodiments, the greater the number of antenna elements 112 in the large antenna array 110, the smaller the widths of the beams 114 so that narrower beams may be provided. Antenna array 110 may be located within a given cell 116 of a cellular network or wideband wide area network (WWAN), or alternatively may be physically located at a vertex of cell 116, and the scope of the claimed subject matter is not limited in this respect. A multiple beam transmission scheme as shown in FIG. 1 may be considered as analogous to a Coordinated Multi-Point (CoMP) system as follows. Each of the beams 114 may be considered as a transmission point (TP) having the same physical identification (ID) similar to CoMP Scenario 4. In a single cell 116, a multiple beam 114 scheme can be analogized to a co-located CoMP scenario to feature almost zero-latency cooperation among the transmission points. As the beams 114 are generated locally within the cell 116, no backhaul mechanism is required. Full scope of cooperation may be provided as data, allocation decisions, and beam feedback may be fully available to all the transmission points. As shown in FIG. 1, a measurement set and/or coordinating set 118 may comprise all of the beams 114 or a group of the beams. A transmitting set may be a subset of the beams 114 to reduce cross-beam interference. Scenarios for cooperative multiple beam transmission are shown in and described with respect to FIG. 2A, FIG. 2B and FIG. 2C, below.

Figure 2A:
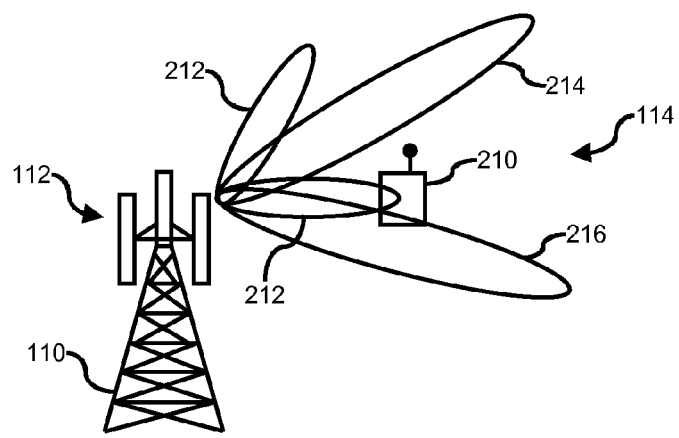
FIG. 2A, FIG. 2B and FIG. 2C are diagrams illustrating typical scenarios of cooperative multiple beam transmission is in accordance with one or more embodiments.
Figure 2B:
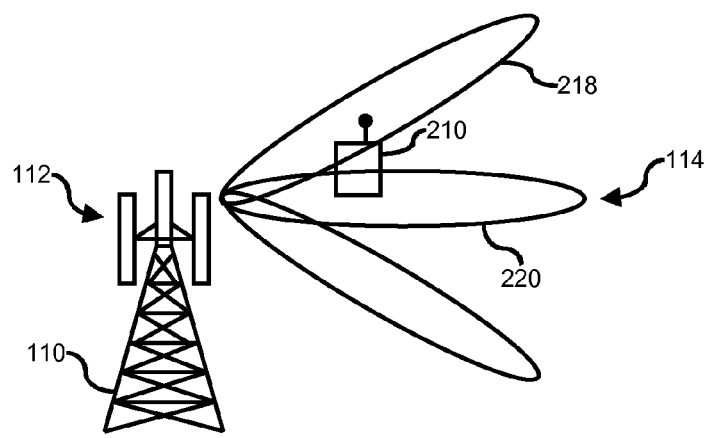
Figure 2C:
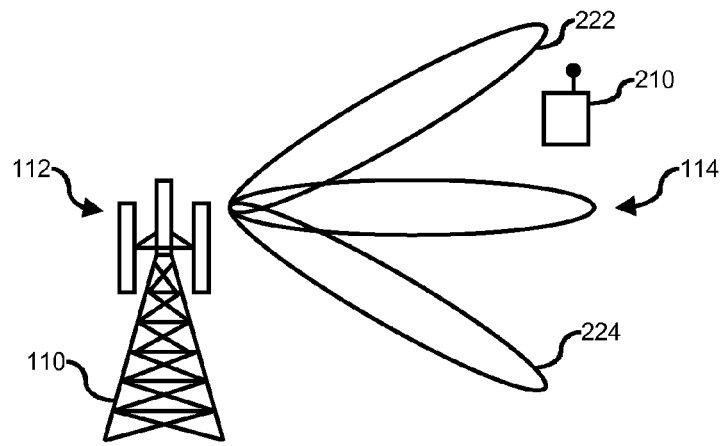

Referring now to FIG. 2A, FIG. 2B and FIG. 2C, diagrams illustrating typical scenarios of cooperative multiple beam transmission is in accordance with one or more embodiments will be discussed. Cooperation among the beams 114 of large antenna array 110 may arise in several scenarios in order to achieve increased performance. FIG. 2A illustrates cross-beam interference as result of one or more side-lobes 212 of one beam 214 interfering with another beam 216 such that a side-lobe 212 may interfere with transmission via beam 216 to user equipment (UE) 210. FIG. 2B illustrates interference as a result of UE 210 being situated at or near an overlapping region between beam 218 and beam 220. FIG. 2C illustrates extension of coverage to UE 210 being outside a main direction of any beam, for example where UE 210 is located between beam 222 and beam 224. In order to implement cooperative multiple beam transmission in the above described scenarios, identification of a subset of the beams 114 may be performed in a first phase, and a cooperation mechanism may be performed in a second phase. For the first phase, there is a likelihood that two or more beams may create mutual interference, especially for closely-spaced beam formations. As a result, in one or more embodiments, eNB 120 may determine which beam 114 is the strongest beam for transmission to selected UE 210, and further may determine which of the beams 114 potentially may be an interfering beam for the selected UE 210. In one example embodiment, large antenna array 110 may comprise an array of 64 antenna elements 112 that radiate in both a horizontal plane and a vertical plane. It should be noted that the large antenna array 110 may comprise various other configurations of antenna elements 112, and the scope of the claimed subject matter is not limited in this respect. In one or more embodiments, the beams 114 to be identified may be identified based at least in part on a coarse representation of a channel of UE 210 via a limited set of antenna elements 112 instead of obtaining channel measurements for all of the antenna elements 112 of large antenna array 110. A two-dimensional approach is shown in described with respect to FIG. 3, below, and a one-dimensional approach is shown in and described with respect to FIG. 4A and FIG. 4B, below.

Figure 3:
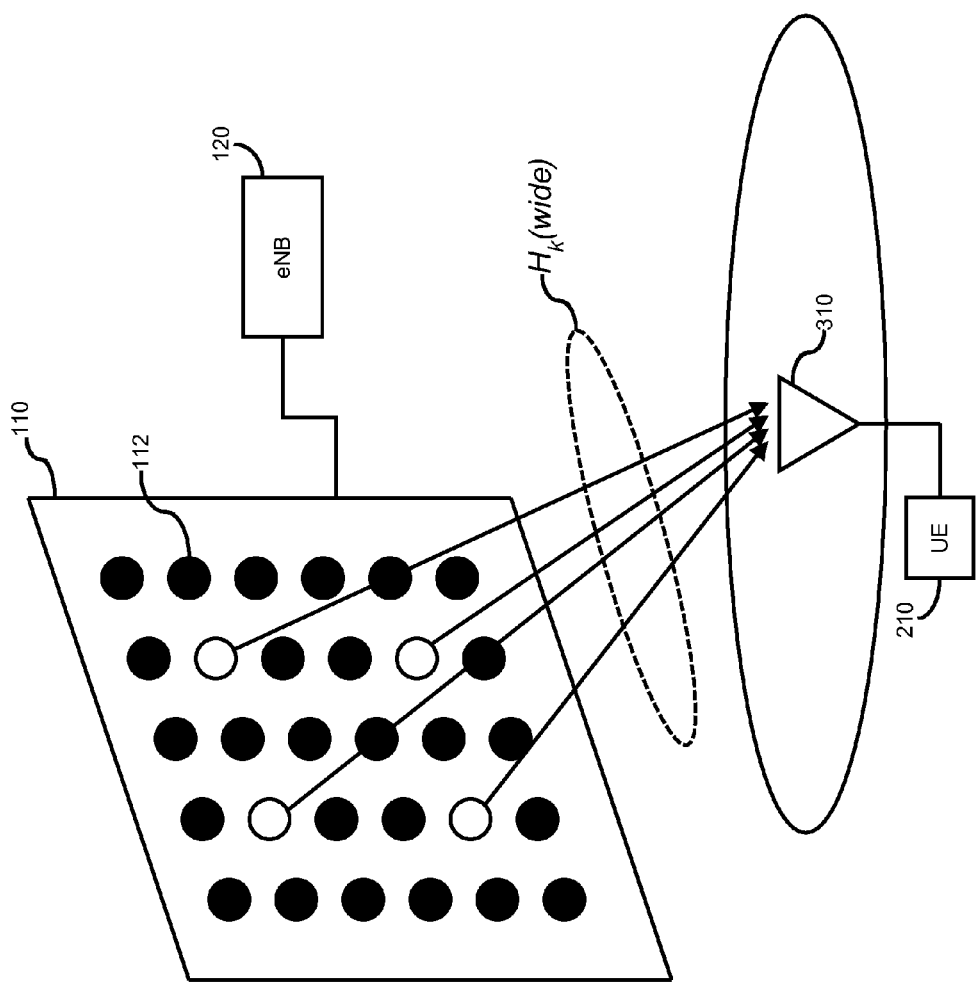
FIG. 3 is a diagram of two-dimensional sub-sampling of an antenna array in accordance with one or more embodiments.

Referring now to FIG. 3, a diagram of two-dimensional sub-sampling of an antenna array in accordance with one or more embodiments will be discussed. As shown in FIG. 3, two-dimensional (2D) sub-sampling of the array of antenna elements 112 may be performed to arrive at an estimate of the channel for user equipment (UE) 210. For the example discussed, large antenna array 110 may comprise an array of 64 antenna elements 112, even though all 64 antenna elements 112 may not be shown in FIG. 3. At enhanced node B (eNB) 120, a subset of antenna elements 112 may be chosen for transmission and mapped to the CSI-RS ports. The maximum number of antenna elements in the subset may be set to eight to conform to Release 10 of the 3GPP specification for Transmission Mode 9 (TM-9). In the example shown in FIG. 3, four antenna elements 112 are selected as the subset for training. The training phase may start with the transmission of CSI-RS as prescribed by Transmission Mode 9 to create a non-directive wide channel toward a k-th user wherein the channel is denoted by $H_k^{(wide)}$. The training signals are received at antenna 310 of UE 210 which processes the CSI information and feeds the CSI information back to eNB 120. At eNB 120, the channel estimate may be processed as follows. Let $$w_k^{(wide)} = \frac{H_k^{(wide)}}{\|H_k^{(wide)}\|}$$

denote the channel direction of the transmitting antennas to UE 210. The received precoding matrix indicator (PMI), denoted by $\tilde{w}_k^{(wide)}$ forms an approximation of $w_k^{(wide)}$. The received PMI $\tilde{w}_k^{(wide)}$ may be interpolated to arrive at an approximation to the precoding weights over all of the antenna elements 112, that is $\tilde{w}_k$, to be derived based at least in part on 2D interpolation, that is $\tilde{w}_k = \text{Interp2D}(\tilde{w}_k^{(wide)})$.

Given a fixed basis function to generate beams 114 such as $\phi_m$: 64×1, m=0, . . . , M, the best beam index, $m_0$, for the best and/or strongest beam 114 may be determined by the extent of alignment between $\tilde{w}_k$ and each $\phi_m$ for M active beams. One possible measure, but not the only measure, is $\max_m |\langle \tilde{w}_k, \phi_m \rangle|$. In addition, the indexes of the first and second dominant interfering beams $m_1$, $m_2$ may be determined to identify the next two strongest beams 114. If the interpolation turns out to be too coarse, the process may be repeated with a new subset of antenna elements 120 spaced apart properly to obtain additional PMI samples and increasing the precision of beam identification.

Figure 4A:
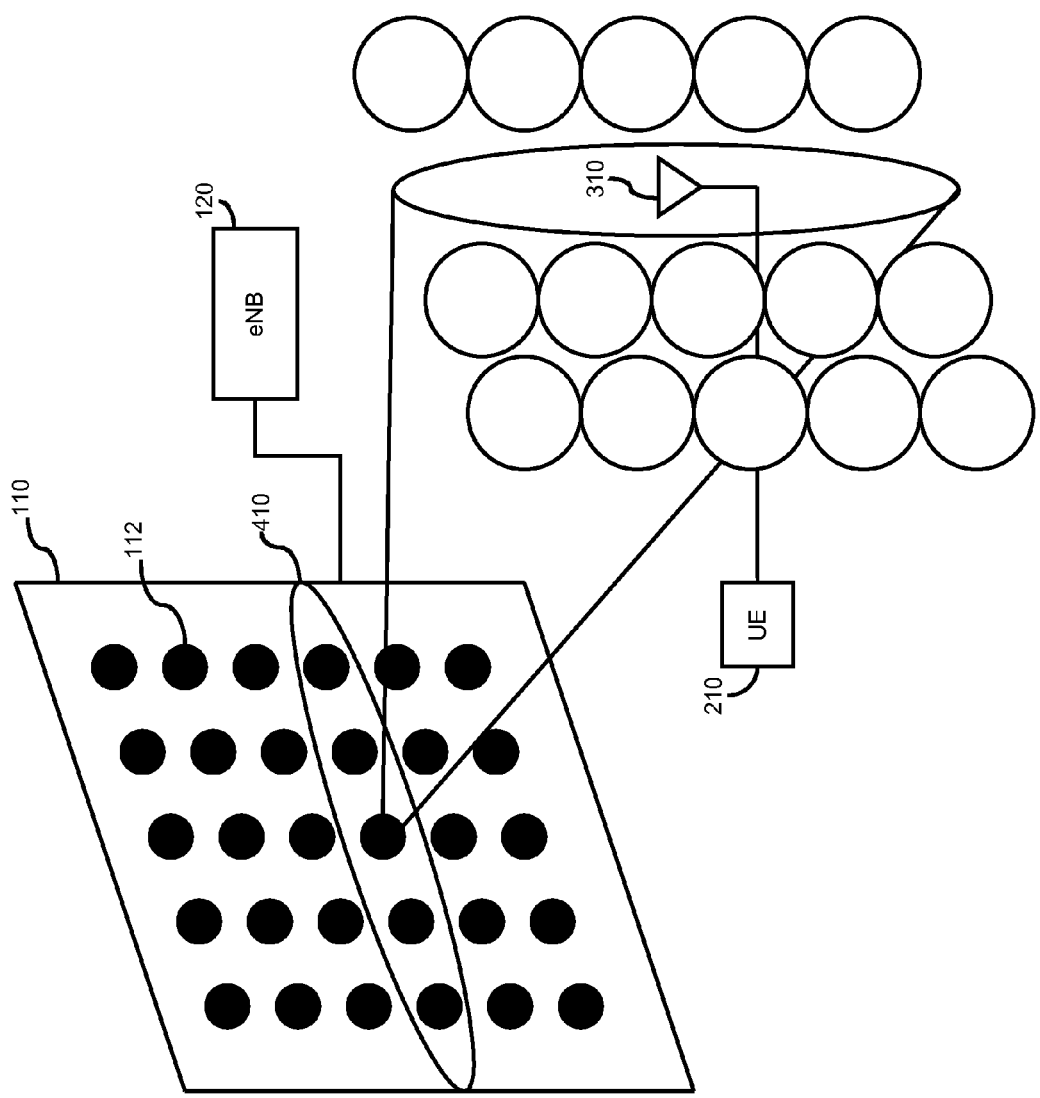
FIG. 4A and FIG. 4B are diagrams of a horizontal training phase and a vertical training phase, respectively, in accordance with one or more embodiments.
Figure 4B:
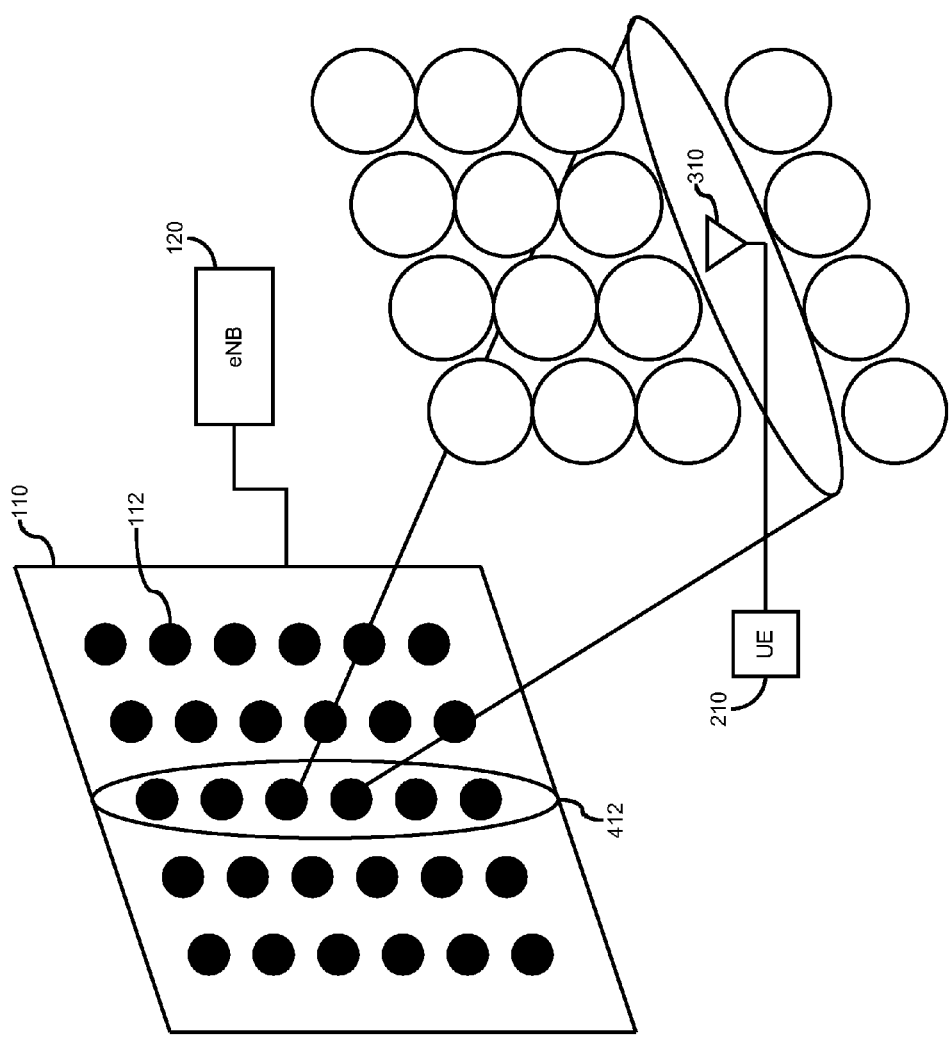

Referring now to FIG. 4A and FIG. 4B, diagrams of a horizontal training phase and a vertical training phase, respectively, in accordance with one or more embodiments will be discussed. In one or more alternative embodiments, in order to identify a best beam for a given user equipment (UE) 210, horizontal and vertical wide channels may be formed and utilized to arrive at a compound channel for the overall large antenna array 110 as outlined, below. In FIG. 4A at eNB 210, transmission of 8 CSI-RS ports are mapped from 8 horizontal antenna elements 112 at 410 to result in $H_{h,k}^{(wide)}$ at the k-th UE 210. In FIG. 4B, at eNB 210, another transmission of 8 CSI-RS ports are mapped from 8 vertical antenna elements 112 at 412 to result in $H_{v,k}^{(wide)}$ at the same UE 210. The horizontal and vertical mappings can be performed in either consecutive subframes in the time domain or in different sub-bands in the frequency domain as shown in and described with respect to FIG. 5, below.

Figure 5:
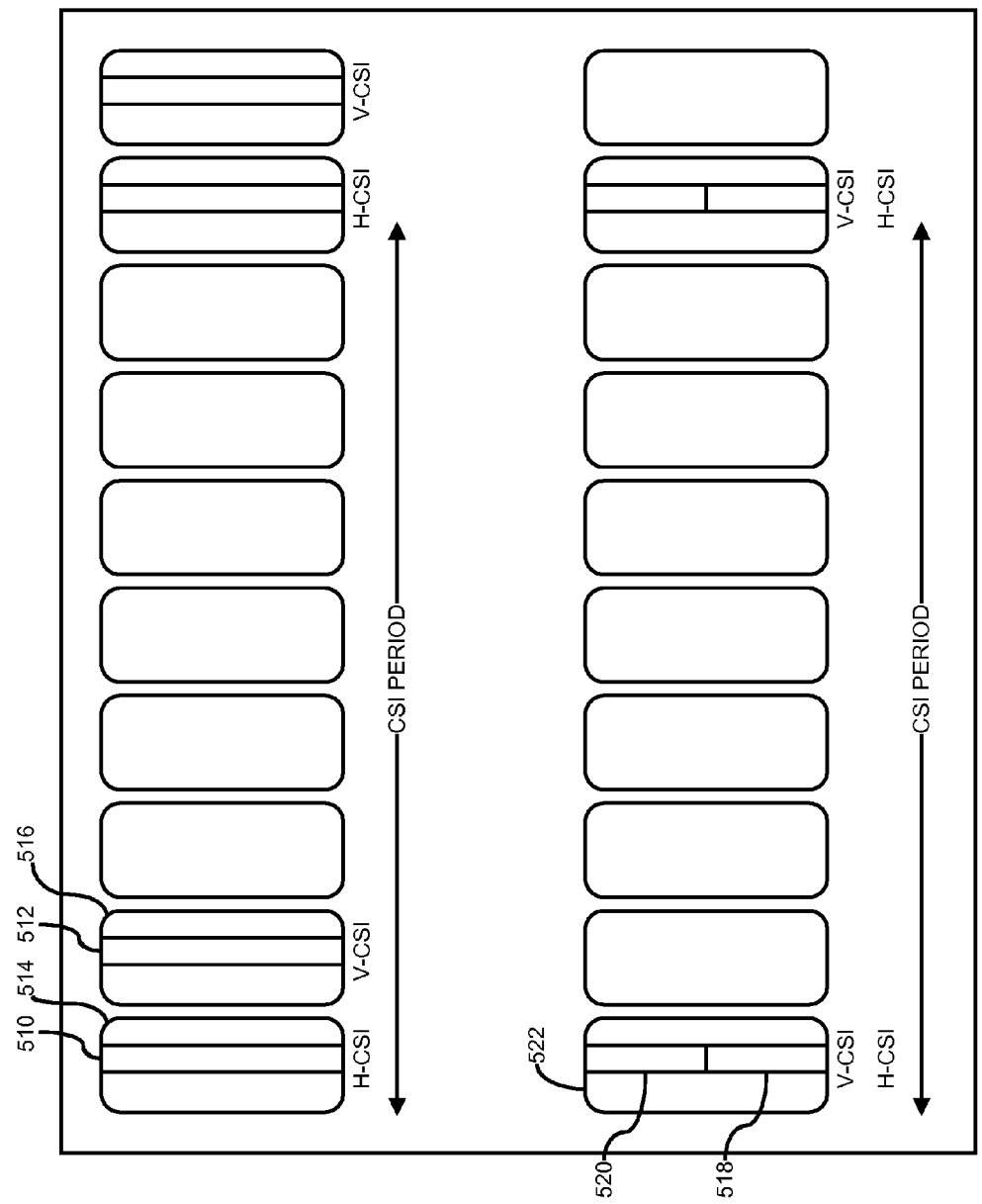
FIG. 5 is a diagram of horizontal and vertical channel state information acquisition staggered in time and stacked in frequency domains in accordance with one or more embodiments.

Referring now to FIG. 5, a diagram of horizontal and vertical CSI acquisition staggered in time and stacked in frequency domains in accordance with one or more embodiments will be discussed. As discussed with respect to FIG. 4A and FIG. 4B, above, two horizontal and vertical mappings may be done in either consecutive subframes in the time domain or in different sub-bands in the frequency domain. As shown in FIG. 5, a horizontal CSI mapping (H-CSI) 510 may be performed in a first subframe 514, and a vertical CSI mapping (V-CSI) 512 may be performed in a second subframe 516 in a given CSI period. Alternatively, a horizontal CSI mapping (H-CSI) 518 may be performed in the same subframe 522 as a vertical CSI mapping (V-CSI) 520 but in different frequency sub-bands within a given CSI period.

In one or more embodiments, at UE 210, H-CSI and V-CSI codewords may be fed back to eNB 120. After receiving the horizontal and vertical codewords, a compound 3D codeword for Rank 1 maybe approximated as a Kronecker product of separable horizontal and vertical codewords, that is $\tilde{w}_k = \tilde{w}_{h,k} \otimes \tilde{w}_{v,k}^T$: 8×8 and $\tilde{w}_k^{(3D)} = col(\tilde{w}_k)$: 64×1. Given $\phi_m$: 64×1, m=0, ..., M, the best beam index, $m_0$, is identified by the best, or nearly best, alignment between $\phi_m$ and $\tilde{w}_k^{(3D)}$. This operation is substantially identical to the 2D sub-array training case as shown in and described with respect to FIG. 3, above. Similarly, the first and second dominant interfering beams $m_1$, $m_2$ may be identified.

Figure 6:
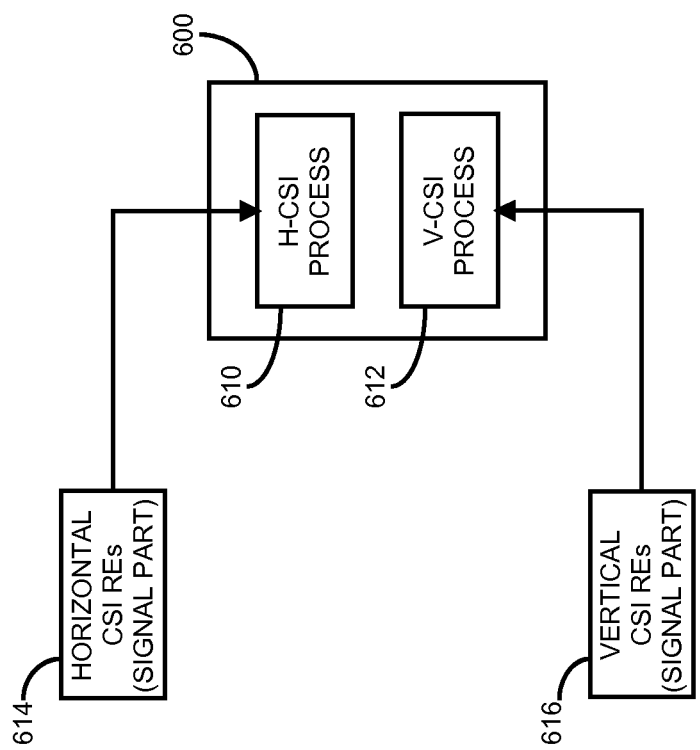
FIG. 6 is a diagram of a channel state information (CSI) process in accordance with one or more embodiments.

Referring now to FIG. 6, a diagram of a channel state information (CSI) process in accordance with one or more embodiments will be discussed. In the two CSI acquisition techniques outlined, above, for either a 2D sub-array scheme or a compound ID vertical and horizontal sub-array scheme, the 2D sub-array scheme may follow a procedure for transmission mode 9 for Release 10 of the 3GPP specification. The 1D time domain horizontal/vertical CSI approach, the CSI process 600 may involve two separate CSI processes, a horizontal CSI process (H-CSI) 610 and a vertical CSI process (V-CSI) 612 as shown in FIG. 6. The time domain two-process CSI arrangement of FIG. 6 may be implemented in multiple ways as follows. In one embodiment, if a legacy transmission mode 9 is utilized to enable beam cooperation, the facility of "resource-restricted CSI" in the form of configuring a UE 210 with separate subframe sets $C_{CSI,0}$ and $C_{CSI,1}$ may be reused. According to Section 7.2.3 in TS 36.213 of the 3GPP specification, these two-subframe sets may correspond to H-CSI and V-CSI, configured through higher layers. If CSI subframe sets $C_{CSI,0}$ and $C_{CSI,1}$ are configured by higher layers, each CSI reference resource belongs to either sets $C_{CSI,0}$ or $C_{CSI,1}$ but not to both. In another embodiment, in transmission mode 10, the UE 210 may be configured with multiple CSI processes with the description of Section 7.2 in TS 26.213 of the 3GPP specification. A UE 210 in transmission mode 10 may be configured with one or more CSI processes per serving cell by higher layers. Each CSI process may be associated with a CSI-RS resourced defined in Section 7.2.5 and a CSI-interference measurement (CSI-IM) resource defined in Section 7.2.6. A CSI reported by the UE 210 corresponds to a CSI process configured by higher layers. Each CSI process can be configured with or without PMI/RI reporting by higher layer signaling. In yet another embodiment, the CSI process may utilize a signal only structure unlike that of transmission mode 10 with signal and interference hypotheses. In such an arrangement, the UE 210 may be configured with only two signal only alternating CSI processes in each CSI-RS period wherein the UE 210 is expected to use common interference measurements as part of a common interference hypothesis, which may be a modification to the behavior of the UE 210 relative to transmission mode 9.

Figure 7:
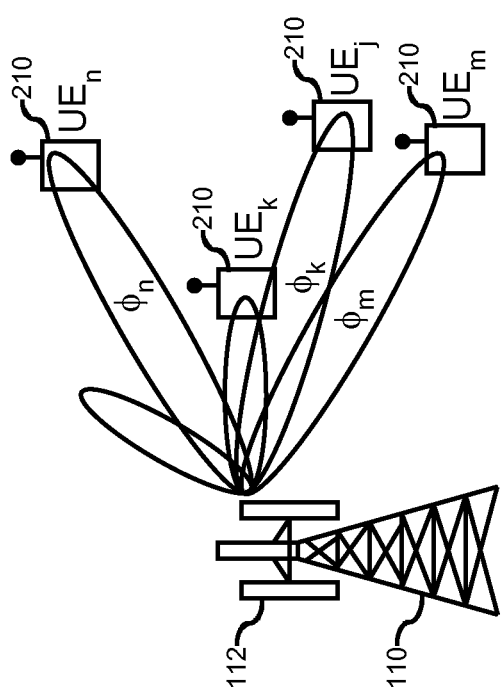
FIG. 7 is a diagram of beam cooperation modes for multiple beams in accordance with one or more embodiments.

Referring now to FIG. 7, a diagram of beam cooperation modes for multiple beams in accordance with one or more embodiments will be discussed. In one or more embodiments, once the strongest beam the next two dominant interfering beams are identified, one or more beam cooperation mechanisms may be implemented to address the interference. Based at least in part on the outcome of beam identification, the following modes may be distinguished with reference to the notation as illustrated in FIG. 7 where $\gamma_1$, $\gamma_2$, $\gamma_3$, $\gamma_4$ are pre-set system thresholds, $\phi_k$, $\phi_m$, $\phi_n$ are bases corresponding to the strongest and two dominant interfering beams, and $q_k$ denotes the message intended for the desired UE 210, user k. For dynamic beam selection, if $|\langle \tilde{w}_k, \phi_k \rangle| > \gamma_1 >> |\langle \tilde{w}_k, \phi_i \rangle|$, i=m, n, then no beam collision occurs and beam $\phi_k$ is selected to carry the data similar to the Dynamic Point Selection (DPS) mode of Coordinated Multipoint (CoMP). The received signal contaminated with out-of-cell interference ($I_{inter}$) and white noise can therefore be written as $x_k = H_k \phi_k q_k + I_{inter} + n_k$.

In one or more embodiments, if $|\langle \tilde{w}_k, \phi_k \rangle| - |\langle \tilde{w}_k, \phi_i \rangle| \leq \gamma_2$ and $|\langle \tilde{w}_k, \phi_i \rangle| > \gamma_3$, i=m, n, then beam collision occurs and one of the following two modes may be adopted. The first mode is interference coordination wherein all identified beams may be valid carriers. Scheduling on the $\phi_m$, $\phi_n$ beams may be delayed so that the beams may be reused for user k which is assumed to be selected by the scheduler function as the pending service target. The received signal is then given by the following equation (where $\alpha$, $\beta$ are the attenuating factors for the interfering beams relative to the strongest beams): $x_k = H_k(\phi_k + \alpha \phi_m + \beta \phi_n) q_k + I_{inter} + n_k$. Where the UE 210 should have access to the precoded demodulation reference signal (DM-RS) of each beam ($H_k \phi_k$, $\alpha H_k \phi_m$, $\beta H_k \phi_n$) in order to coherently combine the signals received from all three beams in a manner similar to Joint Transmission (JT) mode of Coordinated Multipoint (CoMP). The second mode is interference avoidance which may be achieved by muting the $\phi_m$, $\phi_n$ beams and delaying scheduling on them. The received signal may have the same form as that of a no-collision case, above, similar to the Dynamic Point Blanking (DPB) of the CS/CB mode of CoMP.

For the case of a user falling in the white space between two beams, for example as shown in FIG. 2C, cooperation may take on the following form. If two beams such as the $\phi_k$, $\phi_n$ beams are almost equally strong, that is if $|\langle \tilde{w}_k, \phi_k \rangle| \approx |\langle \tilde{w}_k, \phi_n \rangle| > \gamma_4$ and $|\langle \tilde{w}_k, \phi_k \rangle| >> |\langle \tilde{w}_k, \phi_m \rangle|$, then coordination mode through joint transmission may be applied. Scheduling may be delayed on the $\phi_m$, $\phi_n$ beams so that they may be reused for user k. This may occur when no immediate scheduling on the $\phi_m$, $\phi_n$ beams exists and the white space UE 210 is the scheduling target by the scheduler. If there are pending allocations on the $\phi_m$, $\phi_n$ beams, the UE 210 in the white space may be served after a basis update so it may receive a direct beam. In the Joint Beam Transmission scheme, both spatial multiplexing and beam diversity modes may be supported. To support either mode, the UE 210 should be provided with precoded DM-RS of each beam ($H_k \phi_k$, $\beta H_k \phi_n$) so as to enable demodulation of the symbols.

For beam diversity, the same symbol or codeword on different beams results in the following received signal and corresponding signal-to-interference ration for the user k.

$$x_k = H_k(\phi_k + \beta\phi_n)q_k + I_{inter} + n_k$$

$$SNR_k = \frac{(\phi_k^* + \beta\phi_n^*)H_k^*H_k(\phi_k + \beta\phi_n)}{I_{inter} + n_k}$$

For spatial multiplexing, with different codewords per UE 210 on different beams, the received signal and SINRs per stream are given by the following (assuming perfect cancellation of cross-stream interference).

$$x_k = H_k(\phi_k q_{k,1} + \beta\phi_n q_{k,2})q_k + I_{inter} + n_k$$

$$SNR_{k,1} = \frac{\phi_k^* H_k^* H_k \phi_k}{I_{inter} + n_k}$$

$$SNR_{k,1} = \frac{\beta^2 \phi_n^* H_k^* H_k \phi_n}{I_{inter} + n_k}$$

In all of the above cases, $I_{inter}$ refers to the out-of-cell interference and not inter-beam interference. Given coherent combining of the beams through individual DM-RS references, there is no inter-beam interference, that is, interference has been taken advantage of by cooperation among beams.

In general, there are two enhancements to enable cooperative multibeam transmission. In joint transmission mode, each beam will transmit its own DM-RS, coordinated by the eNB 120, and the UE 210 should recognize per beam DM-RS in order to coherently combine multiple beams in the case of Interference Coordination or Beam Diversity modes of operation as described herein, above. This will impact the behavior of the UE 210 as codeword-to-layer mapping with multiple layers, hence DM-RS ports, may not be supported during initial transmissions when only one codeword is enabled. The antenna port, number of layer indication for one codeword in format 2C is tabulated in the left half of Table 5.3.3.1.5C-1 in TS 26.212 of the 3GPP specification as reproduced, below. It is also stated in Section 5.3.3.1.5C of TS 36.212 that for the single enabled codeword, Value=4, 5, 6 in Table 5.3.3.1.5C-1 are only supported for the retransmission of the corresponding transport block if that transport block has previously been transmitted using two, three or four layers, respectively. In support of coordinated beam transmission with a single codeword and multiple DM-RS ports, the current operation should be extended to allow mapping of a single codeword to multiple layers for initial transmissions as well, that is messages in the left column corresponding to values 4, 5, and 6 for the antenna ports, scrambling identity and number of layers indication parameter in DCI formats 2C and 2D also may be applicable for initial transmission.

TABLE 5.3.3.1.5C-1

| Antenna port(s), scrambling identity and number of layers indication | | | |
|---|---|---|---|
| One Codeword: Codeword 0 enabled, Codeword 1 disabled | | Two Codewords: Codeword 0 enabled, Codeword 1 enabled | |
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |

TABLE 5.3.3.1.5C-1-continued

| Antenna port(s), scrambling identity and number of layers indication | | | |
|---|---|---|---|
| One Codeword: Codeword 0 enabled, Codeword 1 disabled | | Two Codewords: Codeword 0 enabled, Codeword 1 enabled | |
| Value | Message | Value | Message |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

In any of the coordination modes, the UE 210 monitors the strength of the beams in the cooperation set for radio resource management operations such as link adaptation in the case of spatial multiplexing. This can be achieved by separate CSI-RS process corresponding to each beam.

Figure 8:
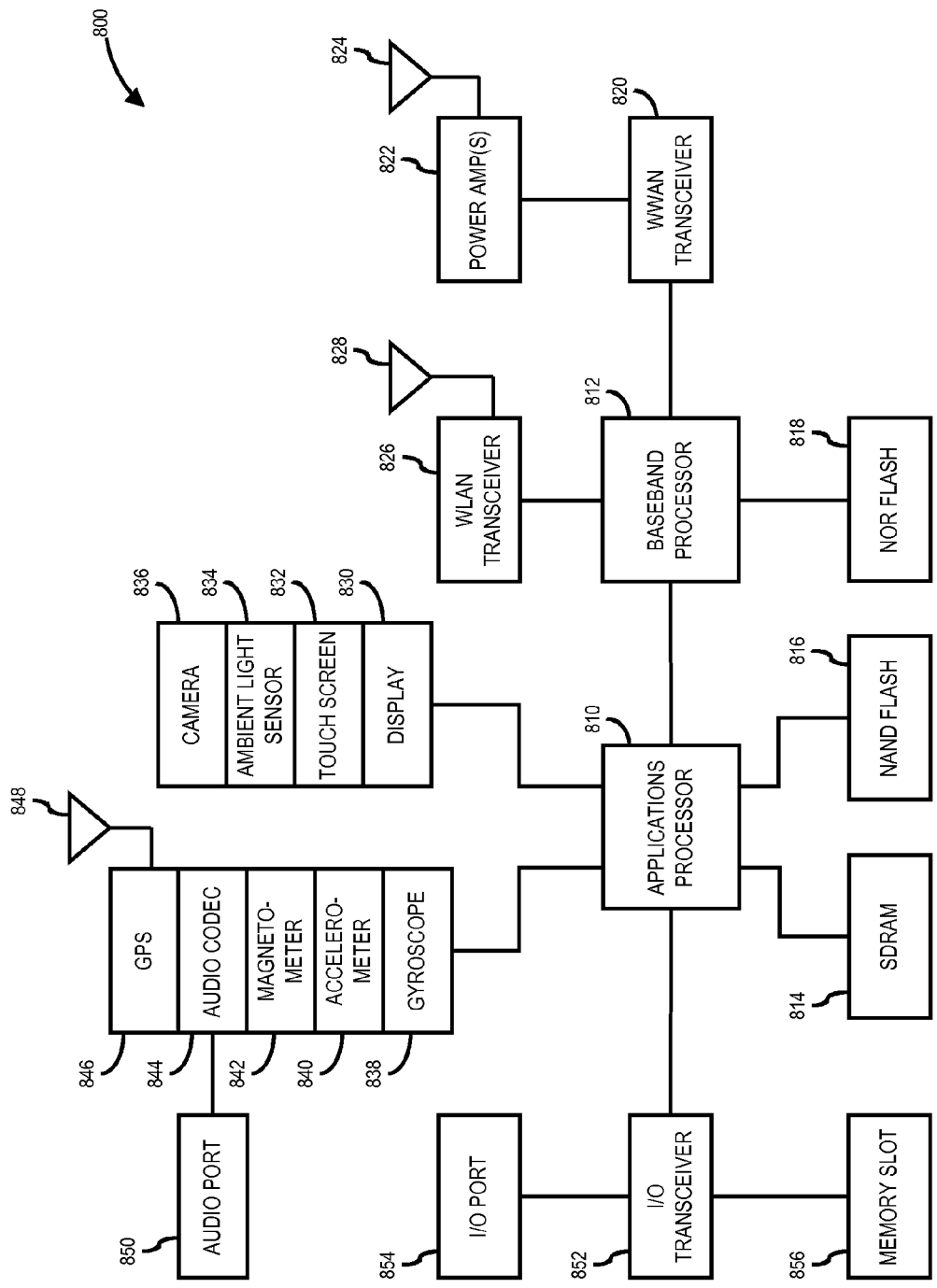
FIG. 8 is a block diagram of an information handling system capable of cooperative multiple beam transmission in accordance with one or more embodiments.

Referring now to FIG. 8, a block diagram of an information handling system capable of cooperative multiple beam transmission in accordance with one or more embodiments in accordance with one or more embodiments will be discussed. Information handling system 800 of FIG. 8 may tangibly embody any one or more of the elements described herein, above, including for example enhanced Node B 120 and/or user equipment 210, with greater or fewer components depending on the hardware specifications of the particular device. Although information handling system 800 represents one example of several types of computing platforms, information handling system 800 may include more or fewer elements and/or different arrangements of elements than shown in FIG. 8, and the scope of the claimed subject matter is not limited in these respects.

In one or more embodiments, information handling system 800 may include an applications processor 810 and a baseband processor 812. Applications processor 810 may be utilized as a general-purpose processor to run applications and the various subsystems for information handling system 800. Applications processor 810 may include a single core or alternatively may include multiple processing cores wherein one or more of the cores may comprise a digital signal processor or digital signal processing (DSP) core. Furthermore, applications processor 810 may include a graphics processor or coprocessor disposed on the same chip, or alternatively a graphics processor coupled to applications processor 810 may comprise a separate, discrete graphics chip. Applications processor 810 may include on board memory such as cache memory, and further may be coupled to external memory devices such as synchronous dynamic random access memory (SDRAM) 814 for storing and/or executing applications during operation, and NAND flash 816 for storing applications and/or data even when information handling system 800 is powered off. In one or more embodiments, instructions to operate or configure the information handling system 800 and/or any of its components or subsystems to operate in a manner as described herein may be stored on a article of manufacture comprising a non-transitory storage medium. In one or more embodiments, the storage medium may comprise any of the memory devices shown in and described herein, although the scope of the claimed subject matter is not limited in this respect. Baseband processor 812 may control the broadband radio functions for information handling system 800. Baseband processor 812 may store code for controlling such broadband radio functions in a NOR flash 818. Baseband processor 812 controls a wireless wide area network (WWAN) transceiver 820 which is used for modulating and/or demodulating broadband network signals, for example for communicating via a 3GPP LTE or LTE-Advanced network or the like.

In general, WWAN transceiver 820 may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, and/or general telemetry transceivers, and in general any type of RF circuit or RFI sensitive circuit. It should be noted that such standards may evolve over time, and/or new standards may be promulgated, and the scope of the claimed subject matter is not limited in this respect.

The WWAN transceiver 820 couples to one or more power amps 822 respectively coupled to one or more antennas 824 for sending and receiving radio-frequency signals via the WWAN broadband network. The baseband processor 812 also may control a wireless local area network (WLAN) transceiver 826 coupled to one or more suitable antennas 828 and which may be capable of communicating via a Wi-Fi, Bluetooth®, and/or an amplitude modulation (AM) or frequency modulation (FM) radio standard including an IEEE 802.11a/b/g/n standard or the like. It should be noted that these are merely example implementations for applications processor 810 and baseband processor 812, and the scope of the claimed subject matter is not limited in these respects. For example, any one or more of SDRAM 814, NAND flash 816 and/or NOR flash 818 may comprise other types of memory technology such as magnetic memory, chalcogenide memory, phase change memory, or ovonic memory, and the scope of the claimed subject matter is not limited in this respect.

In one or more embodiments, applications processor 810 may drive a display 830 for displaying various information or data, and may further receive touch input from a user via a touch screen 832 for example via a finger or a stylus. An ambient light sensor 834 may be utilized to detect an amount of ambient light in which information handling system 800 is operating, for example to control a brightness or contrast value for display 830 as a function of the intensity of ambient light detected by ambient light sensor 834. One or more cameras 836 may be utilized to capture images that are processed by applications processor 810 and/or at least temporarily stored in NAND flash 816. Furthermore, applications processor may couple to a gyroscope 838, accelerometer 840, magnetometer 842, audio coder/decoder (CODEC) 844, and/or global positioning system (GPS) controller 846 coupled to an appropriate GPS antenna 848, for detection of various environmental properties including location, movement, and/or orientation of information handling system 800. Alternatively, controller 846 may comprise a Global Navigation Satellite System (GNSS) controller. Audio CODEC 844 may be coupled to one or more audio ports 850 to provide microphone input and speaker outputs either via internal devices and/or via external devices coupled to information handling system via the audio ports 850, for example via a headphone and microphone jack. In addition, applications processor 810 may couple to one or more input/output (I/O) transceivers 852 to couple to one or more I/O ports 854 such as a universal serial bus (USB) port, a high-definition multimedia interface (HDMI) port, a serial port, and so on. Furthermore, one or more of the I/O transceivers 852 may couple to one or more memory slots 856 for optional removable memory such as secure digital (SD) card or a subscriber identity module (SIM) card, although the scope of the claimed subject matter is not limited in these respects.

Figure 9:
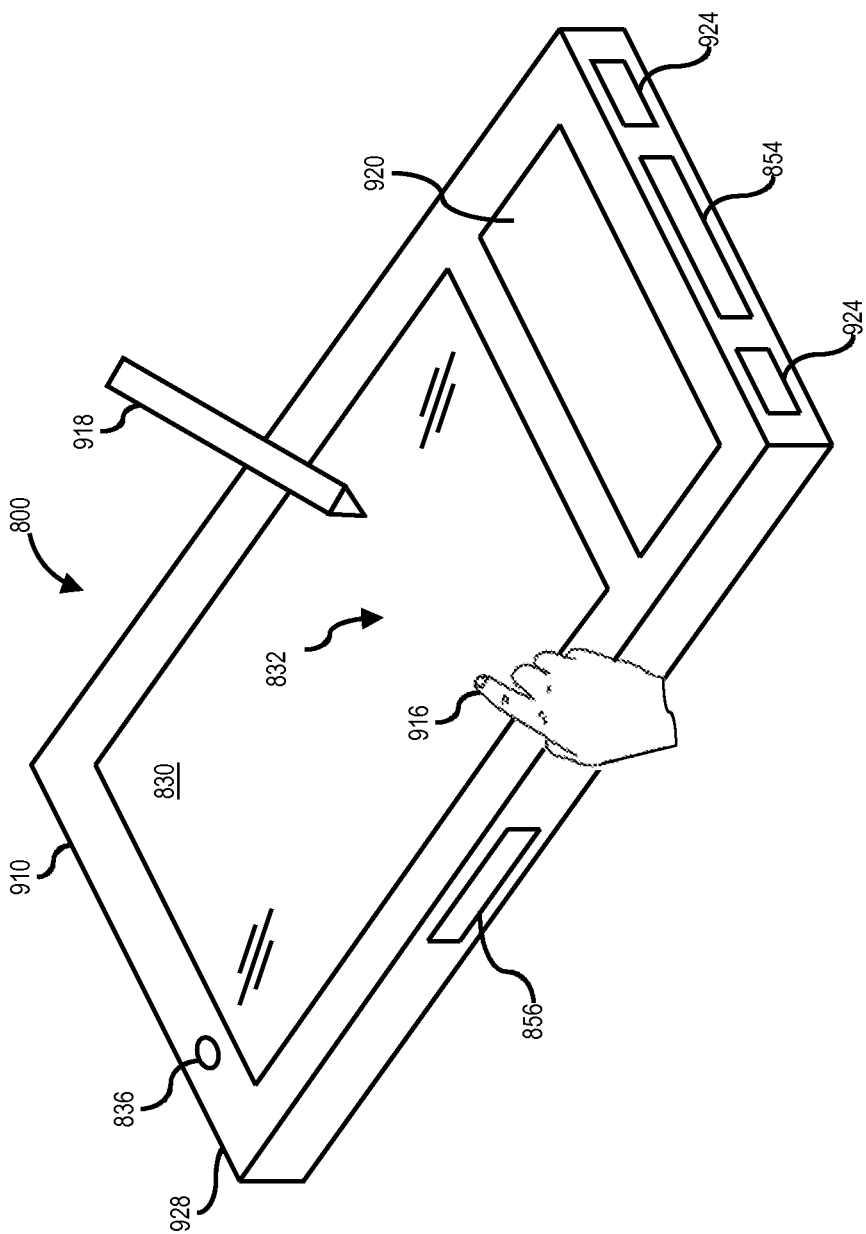
FIG. 9 is an isometric view of an information handling system of FIG. 8 that optionally may include a touch screen in accordance with one or more embodiments.

Referring now to FIG. 9, an isometric view of an information handling system of FIG. 8 that optionally may include a touch screen in accordance with one or more embodiments will be discussed. FIG. 9 shows an example implementation of information handling system 800 of FIG. 8 tangibly embodied as a cellular telephone, smartphone, or tablet type device or the like. The information handling system 800 may comprise a housing 910 having a display 930 which may include a touch screen 932 for receiving tactile input control and commands via a finger 916 of a user and/or a via stylus 918 to control one or more applications processors 810. The housing 910 may house one or more components of information handling system 800, for example one or more applications processors 810, one or more of SDRAM 814, NAND flash 816, NOR flash 818, baseband processor 812, and/or WWAN transceiver 820. The information handling system 800 further may optionally include a physical actuator area 920 which may comprise a keyboard or buttons for controlling information handling system via one or more buttons or switches. The information handling system 800 may also include a memory port or slot 856 for receiving non-volatile memory such as flash memory, for example in the form of a secure digital (SD) card or a subscriber identity module (SIM) card. Optionally, the information handling system 800 may further include one or more speakers and/or microphones 924 and a connection port 854 for connecting the information handling system 800 to another electronic device, dock, display, battery charger, and so on. In addition, information handling system 800 may include a headphone or speaker jack 928 and one or more cameras 836 on one or more sides of the housing 910. It should be noted that the information handling system 800 of FIG. 9 may include more or fewer elements than shown, in various arrangements, and the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to cooperative multiple beam transmission and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An enhanced Node B (eNB) to provide cooperation of multiple beams for transmission, comprising:
   a transceiver to transmit multiple beams to serve a user equipment (UE); and
   a processor coupled to the transceiver to:
      identify a strongest beam for transmission from the eNB to the UE and two additional beams among multiple beams that are dominant for the UE;
      determine if there is any beam collision between the strongest beam and at least one of the two additional beams; and
      in response to a determination that there is no beam collision between the strongest beam and at least one of the two additional beams, select the strongest beam for transmission from the eNB to the UE; or
      in response to a determination that there is beam collision between the strongest beam and at least one of the two additional beams, delay scheduling on one or more of the two additional beams for other users.

2. The eNB of claim 1, wherein the processor is further configurable to:
   perform two-dimensional (2D) subsampling of a subset of a total number of antennas available for transmission for training to approximate a channel, and interpolate the approximate channel to arrive at an estimate of the channel for the total number of antennas.

3. The eNB of claim 2, wherein the processor is further configurable to repeat the 2D subsampling with a new subset of the total number of antennas if said interpolating is too coarse.

4. The eNB of claim 2, wherein the processor is further configurable to identify the two additional beams based at least in part on an extent of alignment between the estimate of the channel and a fixed basis function to generate the two additional beams.

5. The eNB of claim 1, wherein the processor is further configurable to identify the two additional beams by performing a horizontal channel mapping and a vertical channel mapping and combining the horizontal and vertical channel mappings to arrive at a compound channel for an entirety of an array of antennas.

6. The eNB of claim 5, wherein the horizontal channel mapping and the vertical channel mapping occur in consecutive subframes.

7. The eNB of claim 5, wherein the horizontal channel mapping and the vertical channel mapping occur in different frequency bands in a same subframe.

8. The eNB of claim 5, wherein the processor is further configurable to identify the two additional beams based at least in part on an extent of alignment between the compound channel and a fixed basis function to generate the two additional beams.

9. An enhanced Node B (eNB) to provide cooperation of multiple beams for transmission, comprising:
   a transceiver to transmit multiple beams to serve a user equipment (UE); and
   a processor coupled to the transceiver to:
      identify a strongest beam for transmission from the eNB to the UE and two additional beams among multiple beams that are dominant for the UE;
      determine if there is any beam collision between the strongest beam and at least one of the two additional beams; and
      in response to a determination that there is no beam collision between the strongest beam and at least one of the two additional beam, select the strongest beam for transmission from the eNB to the UE; or
      in response to a determination that there is beam collision between the strongest beam and at least one of the two additional beams, mute one or more of the two additional beams.

10. The eNB of claim 9, wherein the processor is further configurable to identify the at least two or more beams by performing two-dimensional (2D) subsampling of a subset of a total number of antennas available for transmission for training to approximate a channel, and interpolating the approximate channel to arrive at an estimate of the channel for the total number of antennas.

11. The eNB of claim 10, wherein the processor is further configurable to repeating the subsampling with a new subset of the total number of antennas if the interpolation is too coarse.

12. The eNB of claim 10, wherein the processor is further configurable to identify the at least two or more beams based at least in part on an extent of alignment between the estimate of the channel and a fixed basis function to generate the at least two or more beams.

13. The eNB of claim 9, wherein the processor is further configurable to identify the two additional beams by performing a horizontal channel mapping and a vertical channel mapping and combining the horizontal and vertical channel mappings to arrive at a compound channel for an entirety of an array of antennas.

14. The eNB of claim 13, wherein the horizontal channel mapping and the vertical channel mapping occur in consecutive subframes.

15. The eNB of claim 13, wherein the horizontal channel mapping and the vertical channel mapping occur in different frequency bands in a same subframe.

16. The eNB of claim 13, wherein the processor is further configurable to identify the two additional beams based at least in part on an extent of alignment between the compound channel and a fixed basis function to generate the at least two or more beams.

17. A non-transitory machine-readable medium having instructions stored thereon that, when executed on a processor in an enhanced Node B (eNB), provide cooperation of multiple beams for transmission to a user equipment (UE), by:
  identifying a strongest beam for transmission from the eNB to the UE and two additional beams among multiple beams that are dominant for the UE;
  determining if there is any beam collision between the strongest beam and at least one of the two additional beams; and
  in response to a determination that there is no beam collision between the strongest beam and at least one of the two additional beam, selecting the strongest beam for transmission from the eNB to the UE; or;
  in response to a determination that there is beam collision between the strongest beam and at least one of the two additional beams, delaying scheduling on one or more of the two additional beams for other users.

18. The non-transitory machine-readable medium of claim 17, wherein the instructions, if executed, further result in:
  if there is no beam collision between the two additional beams, transmitting to the user with a stronger one of the two additional beams.

19. The non-transitory machine-readable medium of claim 17, wherein said identifying comprises performing two-dimensional (2D) subsampling of a subset of a total number of antennas available for transmission for training to approximate a channel, and interpolating the approximate channel to arrive at an estimate of the channel for the total number of antennas.

20. The non-transitory machine-readable medium of claim 19, wherein the instructions, if executed, further result in, if said interpolating is too coarse, repeating said performing of a new subset of the total number of antennas.

21. The non-transitory machine-readable medium of claim 19, wherein said identifying is based at least in part on an extent of alignment between the estimate of the channel and a fixed basis function to generate the at least two or more beams.

22. The non-transitory machine-readable medium of claim 17, wherein said identifying comprises performing a horizontal channel mapping and a vertical channel mapping and combining the horizontal and vertical channel mappings to arrive at a compound channel for an entirety of an array of antennas.

23. The non-transitory machine-readable medium of claim 22, wherein the horizontal channel mapping and the vertical channel mapping occur in consecutive subframes.

24. The non-transitory machine-readable medium of claim 22, wherein the horizontal channel mapping and the vertical channel mapping occur in different frequency bands in a same subframe.

25. The non-transitory machine-readable medium of claim 22, wherein said identifying is based at least in part on an extent of alignment between the compound channel and a fixed basis function to generate the at least two or more beams.

26. A non-transitory machine-readable medium having instructions stored thereon that, when executed on a processor in an enhanced Node B (eNB), provide cooperation of multiple beams for transmission to a user equipment (UE), by:
  identifying a strongest beam for transmission from the eNB to the UE and two additional beams among multiple beams that are dominant for the UE;
  determining if there is any beam collision between the strongest beam and at least one of the two additional beams; and
  in response to a determination that there is no beam collision between the strongest beam and at least one of the two additional beam, selecting the strongest beam for transmission from the eNB to the UE; or
  in response to a determination that there is beam collision between the strongest beam and at least one of the two additional beams, muting one or more of the two additional beams.

27. The non-transitory machine-readable medium of claim 26, wherein said identifying comprises performing two-dimensional (2D) subsampling of a subset of a total number of antennas available for transmission for training to approximate a channel, and interpolating the approximate channel to arrive at an estimate of the channel for the total number of antennas.

28. The non-transitory machine-readable medium of claim 27, wherein the instructions, if executed, further result in, if said interpolating is too coarse, repeating said performing of a new subset of the total number of antennas.

29. The non-transitory machine-readable medium as claimed in claim 26, wherein said identifying is based at least in part on an extent of alignment between the estimate of the channel and a fixed basis function to generate the at least two or more beams.

30. The non-transitory machine-readable medium of claim 26, wherein said identifying comprises performing a horizontal channel mapping and a vertical channel mapping and combining the horizontal and vertical channel mappings to arrive at a compound channel for an entirety of an array of antennas.

31. The non-transitory machine-readable medium of claim 30, wherein the horizontal channel mapping and the vertical channel mapping occur in consecutive subframes.

32. The non-transitory machine-readable medium of claim 30, wherein the horizontal channel mapping and the vertical channel mapping occur in different frequency bands in a same subframe.

33. The non-transitory machine-readable medium of claim 30, wherein said identifying is based at least in part on an extent of alignment between the compound channel and a fixed basis function to generate the at least two or more beams.

* * * * *